United States Patent [19]

Arnould et al.

[11] Patent Number: 5,292,357
[45] Date of Patent: Mar. 8, 1994

[54] DEVICE FOR THE SUPPORTING AND CURVING OF GLASS SHEETS

[75] Inventors: Jean Arnould, Verrieres Le Buisson; Christian Pommera, Charly Sur Marne; Georges Vallee, Jouarre; Bruno Vandecastele, Chateau Sur Marne, all of France

[73] Assignee: Saint-Gobain Vitrage International, Courbevoie, France

[21] Appl. No.: 684,376

[22] Filed: Apr. 12, 1991

[30] Foreign Application Priority Data

Apr. 13, 1990 [FR] France ................................. 90 04806

[51] Int. Cl.⁵ ......................................... C03B 23/031
[52] U.S. Cl. ....................................... 65/289; 65/260; 65/290
[58] Field of Search ........................... 65/289, 290, 260

[56] References Cited

U.S. PATENT DOCUMENTS

| | | | |
|---|---|---|---|
| 3,220,818 | 11/1965 | Barch et al. | 65/289 |
| 3,510,286 | 5/1970 | Cypher | 65/289 |
| 3,536,464 | 10/1970 | Seymour | 65/289 |
| 3,565,598 | 2/1971 | Seymour | 65/289 |
| 4,108,624 | 8/1978 | Claassen | 65/289 |
| 4,353,728 | 10/1982 | Slabach et al. | 65/289 |
| 4,626,207 | 12/1986 | Aubry et al. | 65/289 |

FOREIGN PATENT DOCUMENTS 516652  5/1977  U.S.S.R. .............................. 65/260

Primary Examiner—Joye L. Woodard
Attorney, Agent, or Firm—Oblon, Spivak, McClelland, Maier & Neustadt

[57] ABSTRACT

A support device for glass sheets in a vertical or substantially vertical position serve for holding them during various treatments associated with the operations of curving and/or toughening. The support device is constituted of one or more cross-members (2,3) on which the lower edge face of the glass sheet (1) rests, each cross-member being suspended from a lifting beam (12) by one or more pairs of stays (4) running down the two opposite faces of the glass sheets.

13 Claims, 3 Drawing Sheets

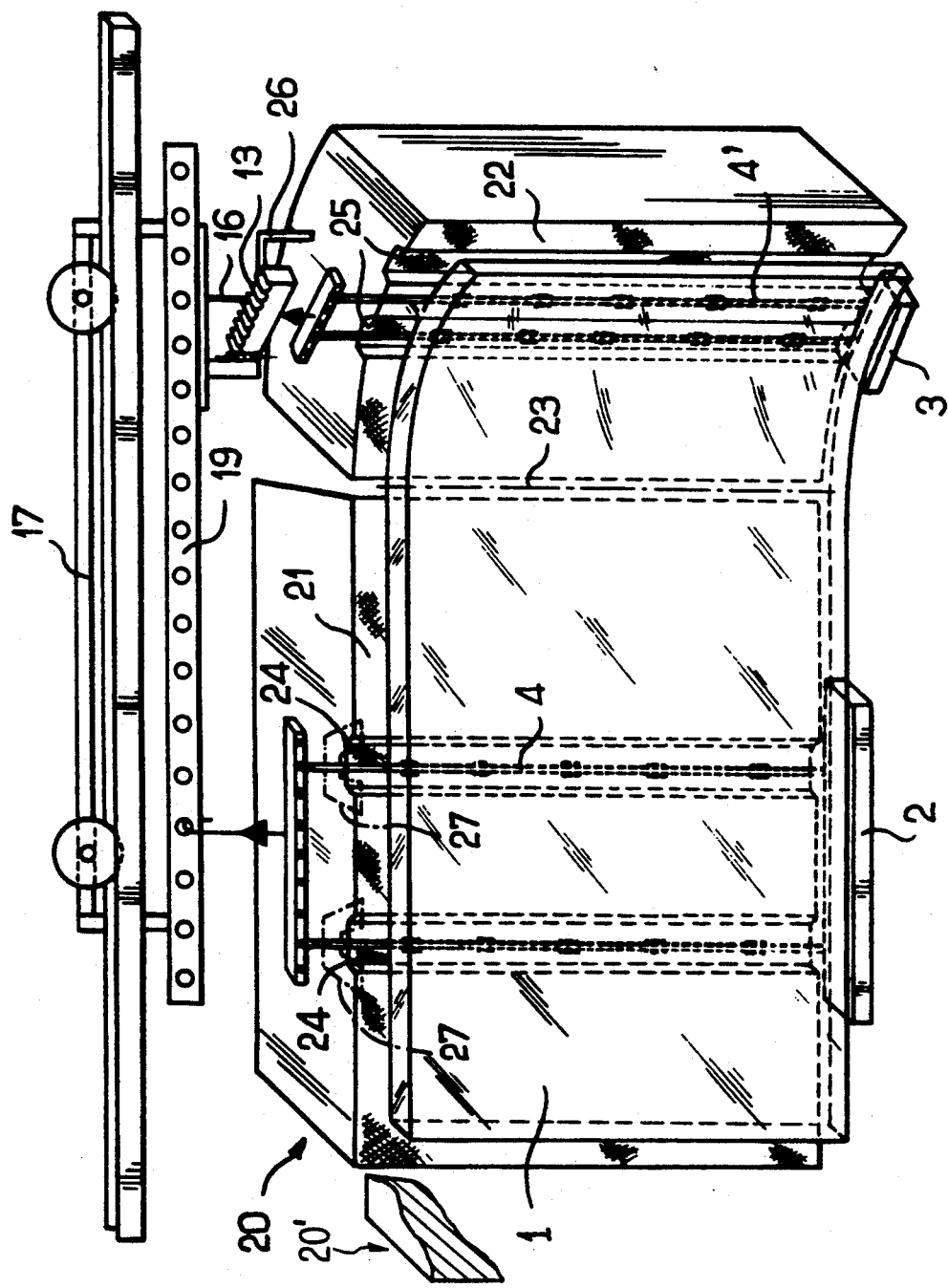
FIG._3

DEVICE FOR THE SUPPORTING AND CURVING OF GLASS SHEETS

BACKGROUND OF THE INVENTION

Field of the Invention

This invention concerns the supporting of glass sheets in a vertical or substantially vertical position during the various treatments to which the glass sheets are subjected for the purpose of curving and/or toughening them, notably for the purpose of their reheating, curving (for example by pressure), thermal toughening and conveying between the various treatment stations. The invention also concerns a device for curving by pressing, cooperating with a support device. It can be applied primarily to the production of curved and toughened glazings of large dimensions having a very pronounced curvature.

Description of the Related Art

In the technology of curved, toughened panes, the quality criteria currently most commonly demanded are strict conformity with the specified curvature, a degree of toughening or tempering corresponding to a desired increase in mechanical strength for the purpose of assuring that any breakage is in conformity with safety standards, an optical quality which excludes any mottling effect and, finally, complete absence of any imprint left by the tools used during the various treatments and markings from tongs which support the pane during vertical treatments.

This latter requirement has favored the development of processes for curving and toughening that operate on a glass sheet held horizontal or substantially horizontal. However, it is impossible to convert a vertical apparatus into a horizontal apparatus; moreover, conventional production lines are of the vertical type and, with the exception of the problem of tong markings, are in no way obsolete from the aspect of the quality of the glazing produced and of the diversity and complexity of the shapes which these vertically operating processes make possible.

Many publications deal with means for holding glass sheets designed for acting only on the edge of the sheets. Thus, there is known, for example from the U.S. Pat. Nos. 2,134,797 and 2,537,803 a curving process according to which the glass sheets are disposed in a frame which holds them by a series of lugs or forks bearing against the different sides of the pane. It has also been proposed, in U.S. Pat. No. 3,298,809 to cause the lower edge of the glass sheet to rest an the horizontal cross-member of a frame and to retain the upper edge by a bearing bar cooperating with locking components.

The fundamental problem in all of these means of support is that the glass sheet can very easily become detached from them, the support being achieved simply by maintaining the stability of the vertical equilibrium position. This is especially true when the support means are generally of small dimensions, in order not to interfere with reheating and/or cooling during the thermal toughening. Moreover, gripping by lugs is possible only if the glass sheet effectively exerts a counter-action, which assumes that it does not subside or curve excessively during heating.

European Patent EP-B-126 687 proposes a frame, of which the holding means being applied against the upper edge of the glass sheet are freely mounted in the vertical direction by means of a lateral guide. These holding means, for example of the piston type, can thus accompany the glass sheet and continue to hold it even when it commences to sag. Furthermore, these holding means can be coupled with tongs, the jaws of which do not close unless the glass sheet escapes from the piston, thereby catching said sheet and preventing it from falling and breaking and allowing it to be removed from the furnace so that the latter is not encumbered with glass debris.

In practice, the frame according to EP-B-126 687 gives good results with small panes, i.e., with panes having a height of less than 600 mm. For greater heights, the subsidence during heating is too great and the jaws regularly come into action to seize the glass sheets, which, although it allows them to be removed from the curving, toughening apparatus, causes markings from tongs.

But even if few panes have all dimensions greater than 600 mm, it is not common for the desired shape to require a positioning of the pane in the frame such that its height corresponds to its largest dimension, which frequently exceeds 1000 mm. The problem especially arises when the pane comprises at least one very curved portion, which requires the use of a curving press in which the female mold is composed of elements assembled with one another and pivotal about assembly axes, the median element being initially the only one to be applied against the glass sheet and the pressing operation continuing by the progressive application of the lateral elements. It will be readily understood that if it is desired that the glass sheet shall not warp or even slide during pressing (these phenomena would at worst result in falling of the glass sheet and, in the most favorable cases, lead to faults in curvature and the development of optical defects), it is essential that the axes of pivoting be vertical. In other words, the shape desired after curving determines the orientation of the pane in the frame.

SUMMARY OF THE INVENTION

The present invention has as an objective a new support for glass sheets in a vertical or substantially vertical position, adapted for holding glass sheets during the various treatments associated with the operations of curving and/or toughening, even though the height of the glass sheets is greater than 600 mm, this being achieved without creating tong marks or optical defects resulting from an excessive perturbation of the operations of heating and thermal toughening.

This objective is achieved by a support device for glass sheets in a vertical or substantially vertical position, composed of one or more cross-members on which the lower edge of the glass sheet rests, each cross-member being suspended from a lifting beam by one or more pairs of stays extending down the two opposite faces of the glass sheet.

In contrast to the support devices known in the art, the device according to this invention does not necessarily comprise means acting upon the upper edge of the glass sheet, this sheet simply resting upon its lower edge and being retained laterally by the stays if it should depart from its vertical equilibrium position or should warp during heating. With such stays which cage the glass sheet, whatever its height may be, any risk of falling of the glass sheet during its heating in the furnace and any later operations, especially toughening or quenching operations, is eliminated without interfering with the toughening process, the stays being sufficiently thin and distant from the glass sheet not to interfere with the intense cooling by blowing of cold air. Furthermore, even if by accident the glass sheet is broken during toughening, for example as a result of incorrect trimming after cutting, the stays are usually sufficient for holding the pieces of glass and preventing them from becoming scattered throughout the apparatus. Moreover, since the amplitude of the movements of the glass sheet in this kind of cage is extremely small, and since the support device is quite specifically intended for panes having a great height, usually greater than 600 mm, the horizontal reaction exerted by the stays is of very small magnitude, which limits the marking phenomena.

In order to entirely eliminate this risk of marking, any direct contact between the glass and the stays is completely avoided by means of spacers. These spacers are, for example, flexible skates or skids which do not mark the hot glass. According to one especially preferred embodiment of the invention, the spacers are composed of sleeves made of a heat-resistant textile material, for example a fabric based upon asbestos or, preferably, a felt of metallic fibers threaded onto the stays. The number and positioning of the spacers can be easily determined from one or two tests which allow the localization of any defects to be established. In practice, one sleeve is used at approximately every 20 centimeters, taking care especially to arrange some of them near the edges of the pane. Similar skids made, for instance, of a silica fiber fabric are also used as intermediate pads between the cross-members and the lower edge face of the glass sheet.

A second advantage of the use of these spacers is that they allow slightly higher reaction forces from the stays to be tolerated, and consequently enable the number of these stays to be reduced, which accordingly limits the problems resulting from any differences in expansion between the different stays.

The stays are not necessarily well tensioned when the support device is empty, the weight of the glass sheets being largely sufficient for exerting the tension required for preventing the stays from rubbing permanently against the glass.

The support device according to this invention may be used simply for the production of toughened flat panes without a bending or curving step, or for the production of panes curved by means of simple pressing frames open at their center. However, the greatest benefit is obtained from such a support device if it is used for carrying out a curving process by pressing by means of solid molds, possibly constituted of elements pivoting about their connecting axes.

In this context, the invention proposes a modification to the pressing molds, in this particular case the forming of hollows on the bearing surfaces against the glass sheet in order to define recessed zones in which the stays of the support device can be accommodated during the closing of the press, this being intended for preventing the stays from being pressed against the glass sheet, which would inevitably mark it.

According to an especially preferred embodiment of the invention, the recessed zones are considerably overdimensioned both in width and in depth. This overdimensioning does not harm the optical quality of the panes, but it increases the tolerances with respect to positioning of the stays. In other words, it allows a greater expansion of the stays, and/or a slight error with respect to the suspension points of the stays from the lifting beams to be accepted.

The invention is especially well adapted to the production of display window panes, notably for food products or jewelry articles. In this case the panes to be produced generally comprise two plane portions, which must be rigorously free from planar defects in view of the intended application, these portions being separated by a cylindrical zone of very small radius of curvature.

Articles of this type are preferably produced by means of a curving press, the female mold of which comprises a pivoting wing which folds down the corresponding part of the pane onto the male mold. In this case, a support device comprising two cross-members is advantageously used, each cross-member being suspended from a lifting beam, preferably by no more than two pairs of stays and preferably by only a single pair of stays, and supporting one of the two parts of the pane, the lifting beam corresponding to the folded part preferably being advantageously capable of pivoting in order to follow the movements of the glass sheet.

BRIEF DESCRIPTION OF THE DRAWINGS

Other advantageous details and characteristics of the invention will become apparent from the description of one particular form of embodiment of the invention, prepared with reference to the attached drawings, which show:

FIG. 3 is a perspective view of a curving press according to this invention used with the support device of FIG. 1.

DESCRIPTION OF THE PREFERRED EMBODIMENTS

Figures 1, 2:
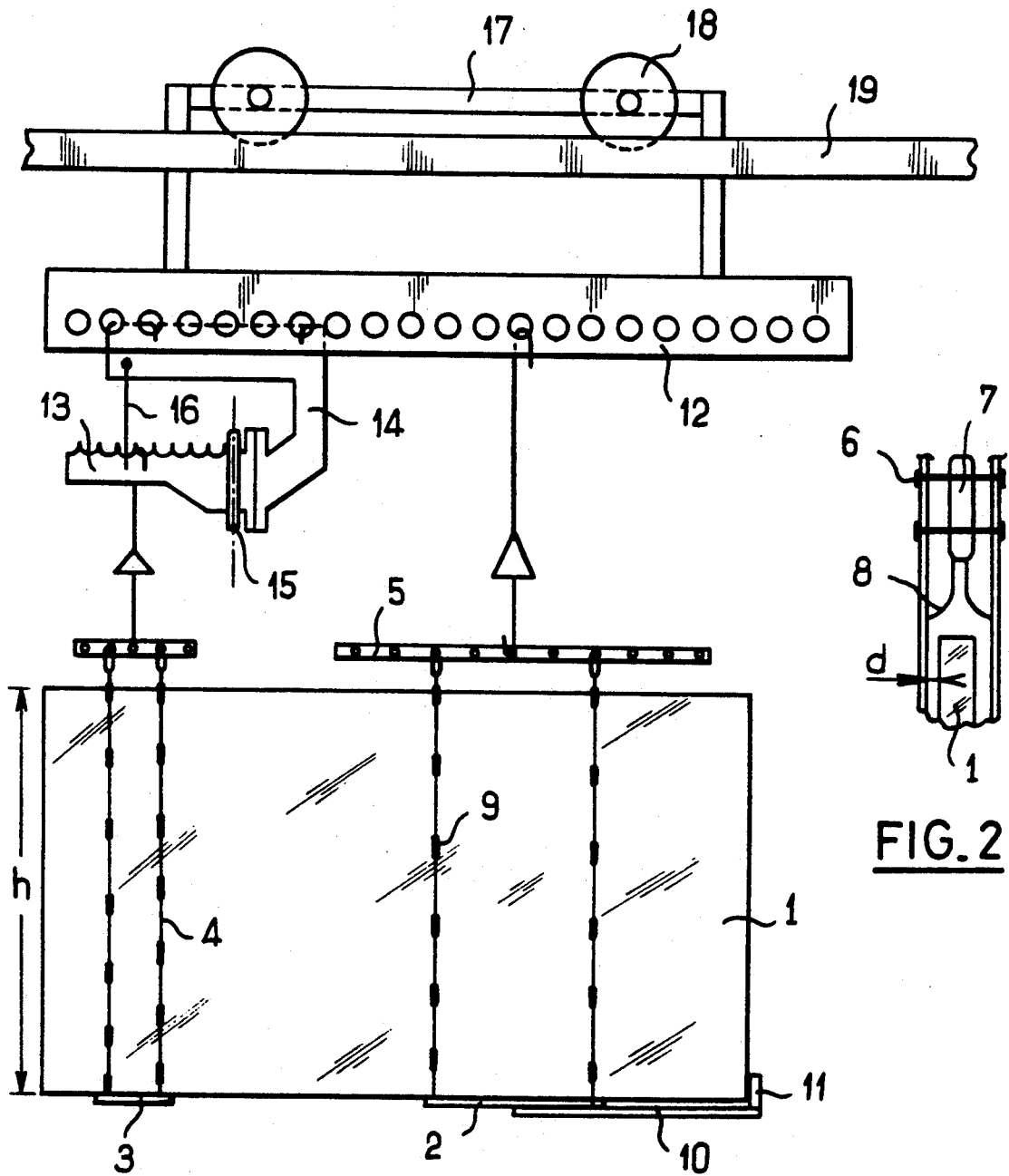
FIG. 1 is a diagrammatic front view of a support device according to this invention.
FIG. 2 is a detail in plan of the method of fixing the stays of FIG. 1.

FIG. 1 is a schematic view of a support device according to a first embodiment of the invention. The glass sheet 1, in the present case rectangular and having a height h of, for example, 1000 mm and a thickness of approximately 6 mm, is held in a vertical or substantially vertical position by the combined action of cross-members 2 and 3 and stays 4. The cross-members 2 and 3 are suspended from the stays 4 which pass on each side of the glass sheet 1, forming a kind of cage. The upper ends of the stays 4 are attached to swingle-bars 5. The stays 4 must be capable of supporting the weight of the glass sheet and of resisting the temperatures of the furnace and the curving operations. For this purpose, wires of 3 to 4 mm diameter may be used, the wires being formed of refractory steel, for example of the stainless steel type, e.g., iron-chromium-aluminum alloy or nickel-chromium alloy. Very good results have also been obtained with an alloy having a low tendency to hot creep, for example a powder metallurgy alloy of the APM type supplied by Kanthal, a company established under Swedish law. The stays 4 are held in tension by the weight of the glass sheet.

Figure 4:
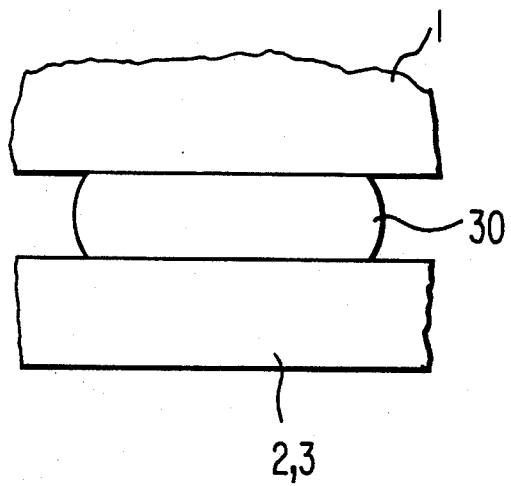
FIG. 4 is a detail of the spacer between the cross beams and the glass sheet.

As shown in FIG. 2, the stays 4 are fixed, for example by screws 6, to an attachment 7, provided with forks 8 which define a spacing d between the glass sheet 1 and the stays 4. This spacing is preferably chosen to be on the order of 2 mm. This spacing is also assured by a series of spacers 9 mounted to the stays and distributed throughout their lengths. These spacers are composed of skids formed of a fairly soft material, in order more effectively to dampen forces acting on the glass. The stays do not mark the glass and are capable of withstanding high temperature, notably a temperature of the order of 650° C. The use of sleeves made from a felt of metallic fibers based upon INCONEL, threaded onto the stays 4, gives complete protection and furthermore allows the position of the skids 9 to be modified in a simple manner as a function of the localization of possible defects. As a general rule, the skids 9 are spaced at 15-20 cm intervals, with one skid near each of the edges of the glass sheet 1. The same felt or, preferably, a white felt of silica fibers, may be used as a spacer 30 between the cross-beams 2, 3 and the lower edge face of the glass sheet (FIG. 4). It should be noted that these skids 9 also fulfill a function during thermal toughening by blowing of cold air, because they permit good circulation of the cooling gas. It is also possible to use wires that are entirely sheathed in a ceramic fabric.

There is no need for the cross-members 2 and 3 to cover the entire length of the glass sheet 1, but their length must be sufficient for adequate spacing of the different stays 4 which hold them. At a minimum, each cross-member may be attached to only a single pair of stays and may be very short. Nevertheless, the operation of loading the glass sheet 1 is simplified if equilibrium is established fairly rapidly, so that it may be preferable to use cross-members at least 10 cm long. To center the glass sheet 1, one of the cross-members is extended by a bar 10, equipped with a heel 11, against which a lateral edge of the sheet bears. As a result of the play in the positioning of the stays on the swingle-bars 5 and/or by suitably positioned counter-weights, it is possible to ensure that the assembly is well balanced.

The swingle-bars 5 are connected to a lifting beam 12, composed of a girder equipped with a series of holes constituting attachment points. The swingle-bar to the right in the Figure is hooked directly onto this lifting beam 12. In contrast, the left-hand swingle-bar, which corresponds to the part of the pane which is to be bent, is hooked onto a toothed rack 13. This toothed rack 13 is fixed to a support 14, hooked onto the lifting beam 12. An articulation 15 allows the toothed rack 13 to be pivoted in a horizontal plane (about a vertical axis), a stop-rod 16 preventing rotation to one side.

The lifting beam 12 is itself carried by a carriage 17, the wheels 18 of which are guided on a rail 19 which conveys the glass sheet 1, supported by its support device, into the furnace and the other installations for curving and/or toughening or quenching. Means are also provided, although not illustrated in FIG. 1, for blocking movement of the carriage 17 and moving the rail 19 vertically. A curving-toughening installation typically comprises a lateral charging installation for the glass sheets, a pit-type furnace above which the curving tools are disposed and, at a third level above the curving tools, blowing chests for toughening or quenching.

FIG. 1 relates to only one of the possible embodiment of the support device according to this invention, and a series of other variations may be made, among them in particular the manner of attachment to the principal lifting beam, it being understood by the person skilled in the art that the glass is never held by more than one fixed point on the lifting beam and that the other points are floating. The use of the pivoting lifting beam is only required if the glass sheet is to undergo a fairly considerable bending. The most important modification relates to the number of cross-members and of stays. With regard to the cross-members this number is fixed by the number of parts of the pane or, in other words, one cross-member for a plane or very slightly curved pane, two cross-members for a single bend line (as is the case with covers for cooking stoves or display windows) and three cross-members for two bending lines (for a U-shaped pane). To each cross member there preferably corresponds at most two pairs of stays and, if possible, only a single pair of stays, it being nevertheless understood that it is preferable to provide at least two pairs of stays per pane.

FIG. 3 illustrates a more advantageous use of the support frame illustrated in FIG. I. In FIG. 3, the glass sheet 1 is illustrated in the course of shaping by means of a curving press composed of two complementary curving molds. The female mold 20 comprises two elements 21 and 22 as is the male mold 20' which is only partially shown for reasons of clarity. The principal element 21 possesses a shaping surface (that is to say a bearing surface against the glass sheet) faced with a woven or felt of refractory fibers which also covers the surface of the element 22 and that of the male counter-mold. The elements 21 and 22 constituting the female mold may be plane or curved to a generally cylindrical curvature according to the type of pane to be produced. The two elements 21 and 22 are articulated about a pivot axis 23 positioned in such a way that the pivoting element 22 does not rub against the glass during bending. Means, not illustrated here, are provided for opening and closing the press and for causing the element 22 to pivot.

The glass sheet 1 is supported by the cross-members 2 and 3, suspended from the stays 4. In order to prevent these stays from marking the glass during the pressing phase, the surface of the elements 21 and 22 is locally made hollow by recesses 24 and 25. Preferably, these recesses are very much overdimensioned and have, for example, a width equal to more than ten times the diameter of the stays and a depth at least equal to twice this diameter and preferably equal to three times this diameter.

The curving or bending operation takes place in the following manner: As soon as the glass sheet 1, previously heated to the appropriate temperature, is correctly positioned between the curving molds, the male curving mold and female curving mold are brought together, so that the principal element 21 applies the glass against the corresponding male element. Just before this pressing takes place, even if a glass sheet of more than 600 mm in height (and in a particular case of 1200 mm height for 6 mm thickness) is warped, it nevertheless is perfectly held by the support device. During the pressing, the stays are situated in the recesses 25.

This operation having been completed, the element 22 is caused to pivot, and thus progressively folds over the wing of the glass sheet, commencing at its zone situated in proximity to the pivot axis and finishing at the edge of the glass sheet. A bar 26 fixed to the element 22, pushes the articulated toothed rack 13, so that it pivots and the glass remains vertical. The stays 4', from which the cross-member 3 is suspended, are also seated in recesses 25 provided for this purpose.

Pressing having been completed, the press is opened and the glass sheet is placed between quenching blowing chests. It has been found that the stays of the support device according to this invention do not interfere at all with the cooling process and that, on the contrary, the breakage rates are rather lower than they are with conventional support devices in which the tongs have a tendency to create defects in the pane, defects which are sensitive to the quenching.

This process has made possible the production of curved panes without any tong marks, and composed of two flat parts, for example of 167 and 681 mm length, respectively, separated by a bend forming an angle of 56° and having a radius of curvature of 114 mm, the articulation axis being parallel to the height of the pane. Tolerances of curvature smaller than 2.5 mm have been produced for heights ranging from 620 mm to 1245 mm.

There has also been produced in accordance with the same tolerances, a U-shaped display window pane comprising three flat zones, respectively of 169, 474 and 97 mm length, with bends respectively of 66° (radius of curvature 100 mm) and 24° (radius of curvature 500 mm), the total height of which is 1267 mm.

These curved panes of large dimensions are given here as examples because they are especially difficult, or even impossible, to manufacture with the same quality and without markings by means of the earlier devices. However, the device of this invention also makes possible the treatment of panes of smaller dimensions.

The recesses formed in the pressing molds are preferably very wide in order to assure a seating for the stays. Nevertheless, optical deformations can appear in some cases—notably where the curving takes place more by pressing (stamping) than by bending. It is then preferable to limit the width of the recesses to approximately 10–15 mm and to guide the stays by wire centering devices, for example V-plates 27, mounted on the female part of the press. These centering devices are used also for the construction of panes comprising two bends, which may then require the use of two articulated toothed racks fixed to the lifting beam. In this case, proper equilibrium of the equipment can only be maintained by eliminating the central anchor point, which generates during bending a slight lateral translatory movement of the top of the stays relative to the glass, thus leading to a difficulty in correctly seating the stays, a difficulty which is relieved by the use of the centering device.

The process according to this invention permits not only the elimination of any tong marks but also an improved conformity to the desired curvature, due to the absence of sliding at the position of the tongs and the absence of elongation of the glass. This latter point is especially advantageous in the case of glass sheets provided with a thin film, for example a pyrolytic coating of tin oxide and, possibly, of indium oxide, because the process according to this invention limits the stresses exerted on the glass and therefore the deterioration which these stresses may possibly cause.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Curving device for curving glass sheets, comprising:
   a vertical curving press comprising molds; and
   a support device for supporting the glass sheet in a vertical or substantially vertical position, the support device being comprised of at least one cross-member upon which a lower edge face of a glass sheet rests, a lifting beam from which at least each cross-member is suspended, and at least one pair of stays extending down two opposite faces of glass sheets supported in the supporting device and connecting the cross-members to the lifting beam,
   wherein the molds of the curving press having bearing surfaces for the glass sheet, the bearing surfaces including recesses in which the stays are accommodated.

2. Curving device for glass sheets according to claim 1, including flexible skids incorporated between each said cross-member and a glass sheet supported in the supporting device.

3. Curving device for glass sheets according to claim 1 including spacers positioned between said stays and glass sheets supported in the supporting device for holding said stays spaced away from the faces of the glass sheets supported in the supporting device.

4. Curving device for glass sheets according to claim 3, wherein said spacers are comprised by sleeves made of a heat-resistant fabric or felt.

5. Curving device for glass sheets according to claim 4, wherein said heat-resistant fabric is based upon asbestos.

6. Curving device for glass sheets according to claim 5, wherein said heat-resistant fabric is formed of refractory ceramic fibers.

7. Curving device for glass sheets according to claim 1, wherein the stays are wires of refractory steel.

8. Curving device for glass sheets according to claim 7, wherein the stays are formed of one from the group consisting of stainless steel and a nickel-chromium alloy.

9. Curving device for glass sheets according to claim 1, wherein said lifting beam is articulated.

10. Curving device for glass sheets according to claim 1 wherein the recesses have a width at least equal to ten times the diameter of the stays.

11. Curving device for glass sheets according to claim 1 wherein the recesses have a depth at least equal to three times the diameter of said stays.

12. Curving device for glass sheets according to claim 1, wherein said support device comprises two of said cross-members suspended by at most four pairs of stays, wherein the molds include a male part and a female curving mold comprising two elements pivotable relative to each other, a first of said elements pressing a principal part of a glass sheet supported in the supporting device and a second of said elements then folding over a wing of the glass sheet onto the male part of the mold, and wherein one said cross-member is associated with each part of the glass sheet.

13. Curving device according to claim 1, including centering devices mounted on the molds and comprising means for guiding the stays.

* * * * *